(No Model.) 5 Sheets—Sheet 2.
H. R. CORKHILL, Sr.
PAMPHLET COVERING MACHINE.
No. 438,265. Patented Oct. 14, 1890.
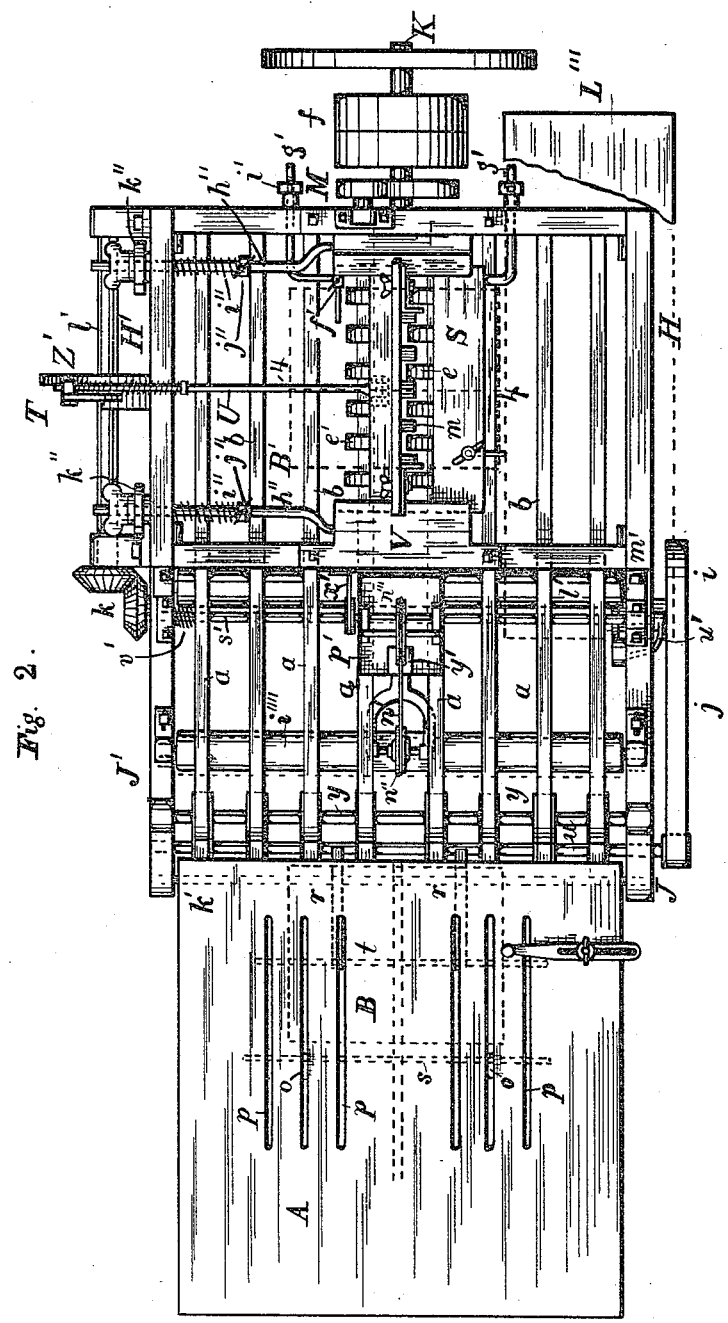
Witnesses:
William Ollis
C. G. Cranwell.
Inventor:
Henry R. Corkhill, Sr.
By Geo. B. Selden,
Atty.

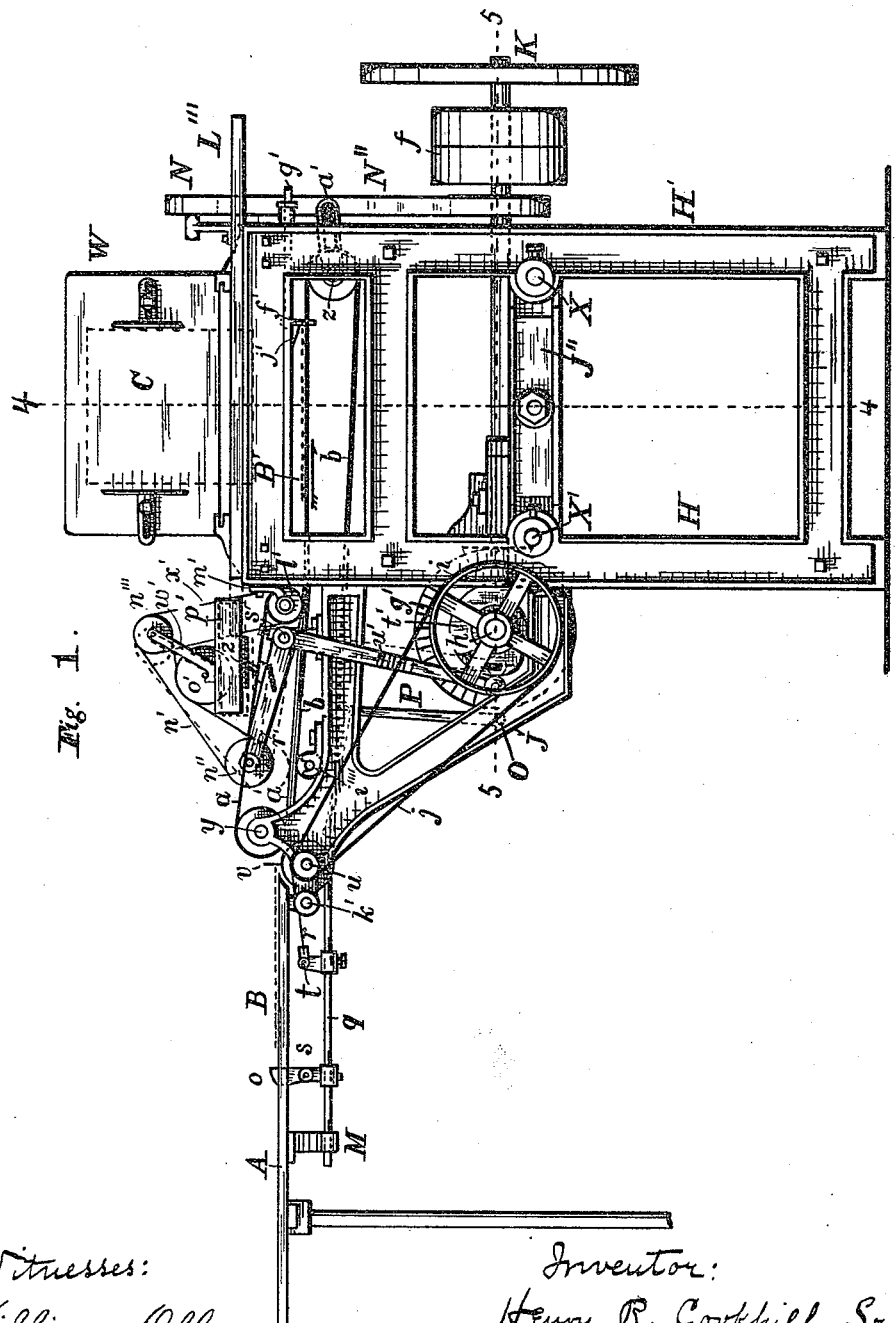

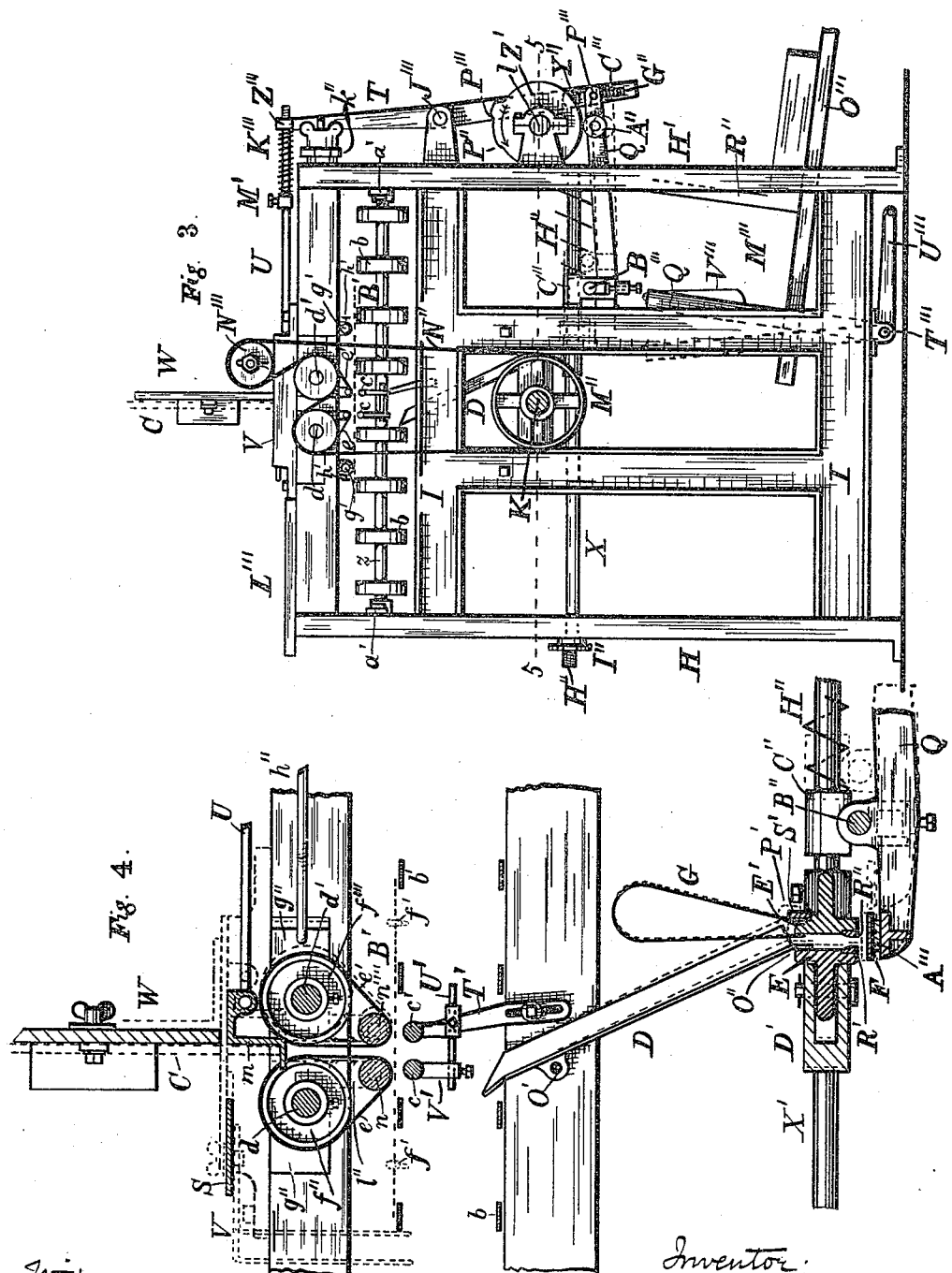

(No Model.) 5 Sheets—Sheet 4.
H. R. CORKHILL, Sr.
PAMPHLET COVERING MACHINE.
No. 438,265. Patented Oct. 14, 1890.
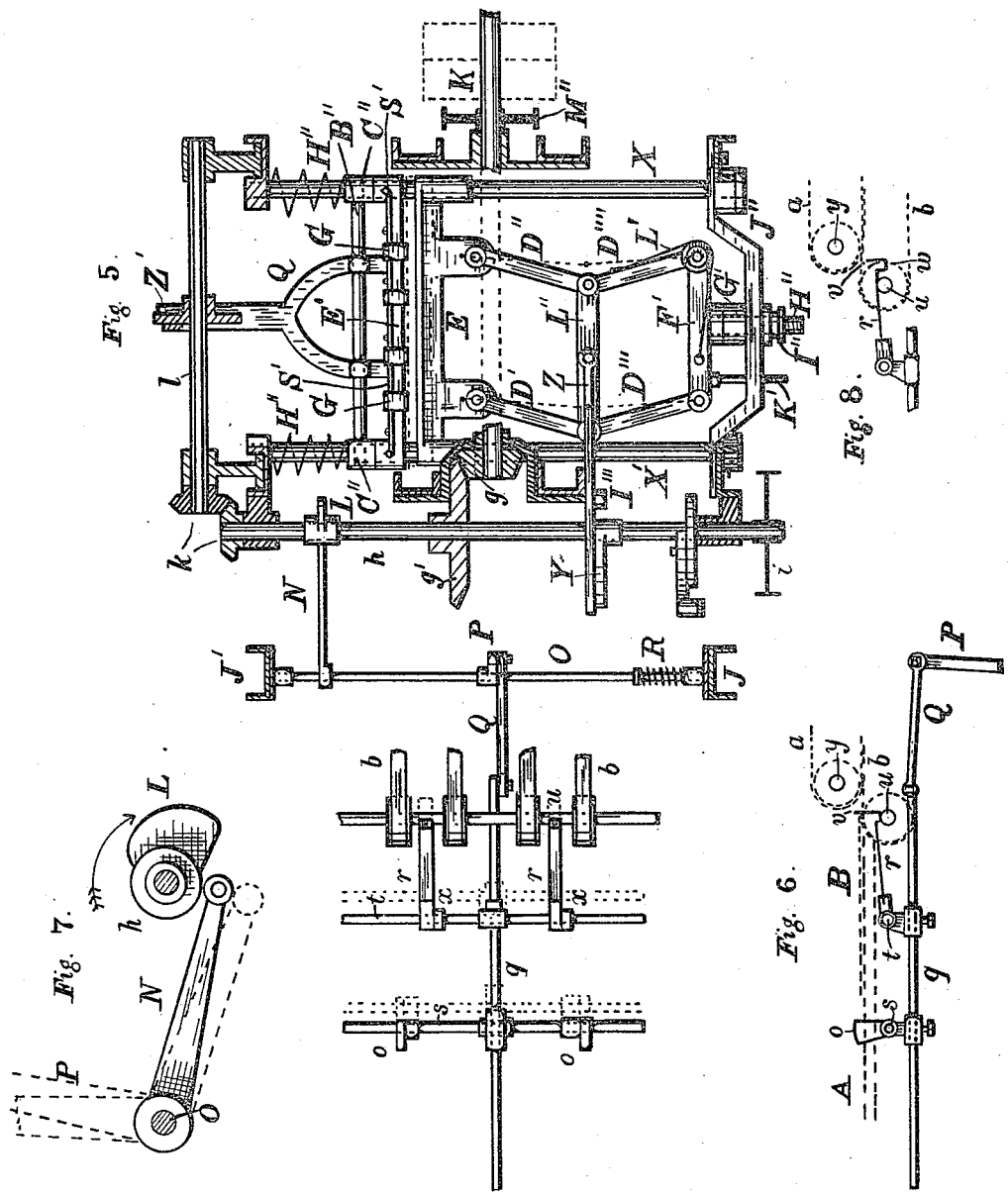

(No Model.) 5 Sheets—Sheet 5.
H. R. CORKHILL, Sr.
PAMPHLET COVERING MACHINE.
No. 438,265. Patented Oct. 14, 1890.
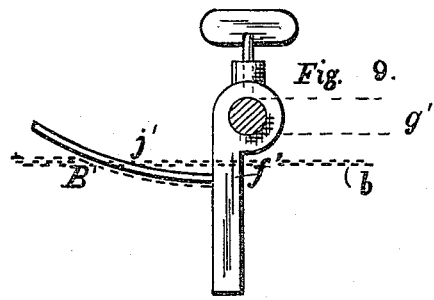
Fig. 9.
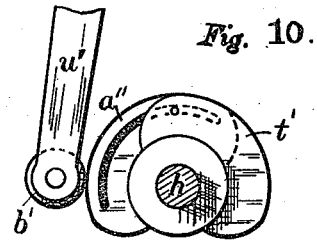
Fig. 10.
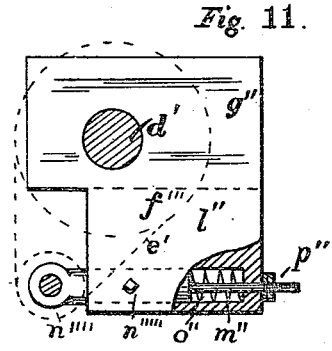
Fig. 11.
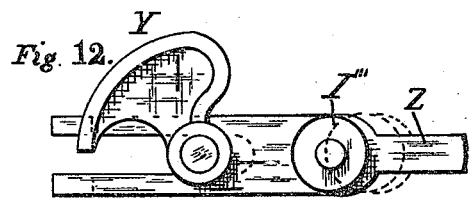
Fig. 12.
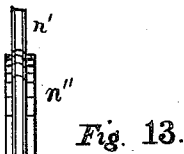
Fig. 13.
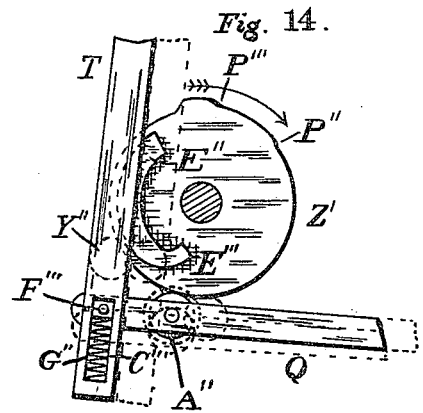
Fig. 14.
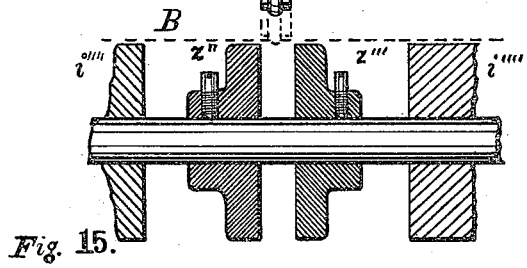
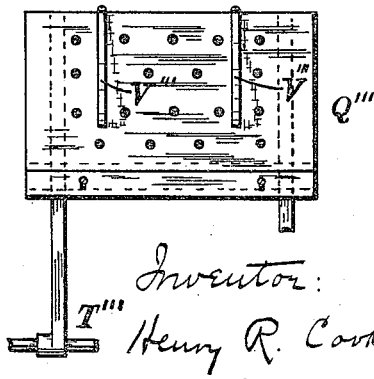
Fig. 15.
Witnesses:
William Ollis
E. G. Crannell.
Inventor:
Henry R. Corkhill, Sr.
By Geo. B. Selden
Atty.
THE NORRIS PETERS CO., PHOTO-LITHO., WASHINGTON, D. C.

UNITED STATES PATENT OFFICE.

HENRY R. CORKHILL, SR., OF ROCHESTER, NEW YORK.

PAMPHLET-COVERING MACHINE.

SPECIFICATION forming part of Letters Patent No. 438,265, dated October 14, 1890.

Application filed April 7, 1890. Serial No. 346,940. (No model.)

*To all whom it may concern:*

Be it known that I, HENRY R. CORKHILL, Sr., a citizen of the United States, residing at Rochester, in the county of Monroe and State of New York, have invented certain Improvements in Pamphlet-Covering Machines, of which the following is a specification, reference being had to the accompanying drawings.
My invention relates to certain improvements in pamphlet-covering machines, which improvements are fully described and illustrated in the following specification and the accompanying drawings, the novel features thereof being specified in the claims annexed to the said specification.

In the accompanying drawings, representing a pamphlet-covering machine embodying my improvements, Figure 1 is a side elevation.
Fig. 2 is a plan view. Fig. 3 is an end elevation representing the machine as seen from the right hand in Fig. 1. Fig. 4 is a partial transverse section on the line 4 4, Figs. 1 and 2. Fig. 5 is a horizontal section on the lines 5 5, Figs. 1 and 3, showing also the cover-feeding mechanism in plan. Fig. 6 is a side elevation showing the operation of the cover-feeding mechanism. Fig. 7 represents the cam which operates the cover-feeding mechanism. Fig. 8 is a diagram representing the operation of the spring-fingers which control the entrance of the covers into the machine. Fig. 9 represents the adjustable stops which arrest the covers. Fig. 10 represents the cam which operates the gluing mechanism. Fig. 11 represents a modification by which the lower pamphlet-feeding rollers are made adjustable. Fig. 12 represents the cam which operates the movable clamp. Fig. 13 is a longitudinal section through the roller which supports the covers underneath the gluing-roller. Fig. 14 represents the cams which operate the back-former and the gate. Fig. 15 is an elevation of the packer.

In the operation of my improved pamphlet-covering machine the covers are fed into the machine by one operative, while the pamphlets or books to be covered are placed in the machine by another operative. The covers, being laid on a horizontal table, are moved at the proper times by suitable feeding mechanism, which carries them under a vibrating gumming or gluing apparatus, by which a streak of adhesive material is applied along their centers, and which delivers the gummed covers into a position in the path of the pamphlets, which descend vertically upon the covers. The pamphlets are forced downward by suitable machinery at the proper time to bring their backs in contact with the gummed centers of the covers. The covers are caused to adhere to the pamphlets by the operation of the machinery, and as the covered pamphlets descend through the machine they are subjected to pressure both laterally and edgewise, so as to give the requisite square shape to the backs of the covered pamphlets. The pamphlets are then released from the pressure and allowed to drop downward out of each other's way.

The general arrangement of my machine will be understood from an examination of Fig. 1 of the accompanying drawings, in which A represents the feed-bank on which the covers B are placed, and from which they are carried by the endless belts *a* and *b* to the position indicated by B', where they are arrested by suitable stops while the pamphlets C descend upon them.

The further operation of the machine will be understood from the sectional view, Fig. 4, in which are represented the belts *e e'*, which feed the pamphlets down upon the covers at B', the covers being bent or folded upward around the back and on both sides of the pamphlets by the rollers *c c'*, after which the covered pamphlets descend down the chute D in between the jaws or clamps E E', by which they are subjected to lateral pressure, while the backs of the pamphlets are shaped by the back-former F. After these operations the back-former is withdrawn, the clamps E E' are opened, and the pamphlets are separated from the clamp E on one side by the chute D and on the other side from the clamp E' by the springs G, so that they are permitted to descent into a suitable receptacle. The pamphlets are then moved out of the way by the packer, so as to make room for the succeeding ones.

Proceeding now to a more detailed description of my improved pamphlet-covering machine, H H' represent the side frames, which are secured together at suitable distances apart by the cross-ties I, the side frames being provided with the extensions or brackets J J', which support the inner end of the feed-bank and the parts connected therewith.

K is the main driving-shaft, which receives motion through a belt passing over the pulleys $f$. At its inner end the shaft K is provided with a bevel-pinion $g$, Fig. 5, meshing with the bevel-gear $g'$ on the transverse shaft $h$, which operates the carrier-belts $a$ and $b$ through the pulley $i$ and the belt $j$, and is provided at its other end with the miter-bevels $k$, which drive the shaft $l$, which operates the back-former F through a suitable cam, and also actuates the pamphlet-delivery slide $m$, Fig. 4, by a supplementary cam, which cams are more fully represented in Fig. 14.

The cover-feeding mechanism consists, essentially, of a sliding rod or bar $q$, operated by a cam L, Figs. 5 and 7, on the shaft $h$, and carrying the pushers $o$, which project upward through slots $p$ in the feed-bank A, and also the spring-fingers $r$, which control the entrance of the covers between the carrying-belts $a$ and $b$. The rod $q$ is arranged to slide in suitable guides or supports M, attached to the lower side of the feed-bank A. A reciprocating motion is given to the rod $q$ by means of the cam L, arm N, rock-shaft O, arm P, and link Q, the return motion of the rod being secured by the spring R, Fig. 5, one end of which is attached to the extension-frame J or to a boss thereon, while the other end is attached to a collar on the rock-shaft.

The shape of the cam L is shown in Fig. 7, from which it will be seen that while the inward movement of the sliding rod $q$ is made quickly the return motion under the influence of the spring R is retarded, while the roller on the end of the arm N is traveling along the curved outer edge of the cam L. The pushers $o$ are attached to the sliding rod $q$ by the transverse rod $s$, secured to the rod $q$ by a clamp provided with a set-screw, which permits the adjustment of the pushers to and from the belts $a$ and $b$, so as to adapt the machine to feeding covers of different lengths. Provision is also made for varying the distance between the pushers by moving them lengthwise on the rod $s$. As represented in the plan view, Fig. 2, the slots $p$ in the feed-bank are located in pairs at equal distances on each side of the center line. For narrow blanks the pushers are arranged to project upward through the innermost pair of slots, and for wider blanks they are placed in the outer slots. The spring-fingers $r$ are adjustably attached to a transverse rod $t$, secured to the sliding rod $q$, so that they can be adjusted laterally to adapt the machine to feeding covers of different widths. The rod $t$ is also adjustable lengthwise of the rod $q$. The inner ends of the spring-fingers are bent downward, so as to bear on the shaft $u$, which carries the pulleys of the lower feed-belts $b$, and then again sharply upward, as represented at $v$, Figs. 6 and 8, so as to project above the path of the covers B and to prevent their entering between the feed-belts until the projecting ends $v$ move downward out of said path in consequence of the motion of the sliding rod $q$ toward the feed-belts, as indicated in Fig. 8. When the fingers $r$ are moved inward toward the feed-belts, the bent portions $w$ of the fingers pass beyond the shaft $u$, as indicated in Fig. 8, and the fingers spring downward, so as to withdraw their points $v$ from the path of the covers. The return movement of the fingers is delayed, as already explained, by the operation of the cam L, so as to prevent their points from being forced upward through the next cover. When the spring-fingers return, the bent portions $w$ ride upon the shaft $u$, so as to bring the points again into the path of the covers, as represented in Fig. 6, after the last cover fed has passed entirely between the feed-belts. The spring-fingers $r$ are attached to the rod $t$ by sockets $x$, which are capable of being adjusted lengthwise on the rod.

In the operation of the feed mechanism the covers are laid one by one on the feed-bank, as represented by the dotted lines B, Fig. 1, and they are fed into the machine between the endless feed-belts $a$ and $b$, which run continuously, by the movement of the pushers $o$, the exact time of the entrance of a cover into the machine being determined by the finger-points $v$. It will be observed that the shaft $y$, which carries the pulleys of the upper feed-belts $a$, is arranged at a short distance to the right hand of the shaft $u$ of the lower feed-belts $b$, so that the belts may grip the front edge of the cover evenly when the pushers force the cover forward, and the cover is consequently carried into the machine squarely or with its front edge substantially at right angles with the direction of motion. This result is accomplished by placing the shaft $y$ out of line with the shaft $u$ either forward or back, so that the front edge of the sheet is gripped with an elastic pressure between the belts supported by the pulleys on one side and the belts sustained by their tension only on the other side. As represented in the accompanying drawings, the belts are made of ordinary press-tape; but any suitable material or cords may be employed for them.

The shaft $u$, carrying the pulleys which drive the lower feed-belts $b$, is provided on its outer end with a pulley on which the belt $j$ runs, which receives motion from the pulley $i$ on the shaft $h$. At the other end the carrying-belts $b$ are supported by pulleys on the shaft $z$, which revolves in journals in the adjustable brackets $a'$, secured to the side frame of the machine and provided with set-screws, by which the tension of the belts may be regulated.

The carrying-belts $b$ are arranged so as to bring the covers into the position indicated at B' in the path which the pamphlets traverse in their descent through the machine. Suitable adjustable stops $f'$, Figs. 1, 2, and 9, are provided, by which the movement of the cover is arrested at the proper point relatively to the path of the pamphlets. These stops are carried by the bent arms $g'$, passing through or attached to the frame of the machine and provided with set-screws or other devices by which the stops may be adjusted on them. The rods $g'$ are secured by the set-screws $h'$, Fig. 3, and they are provided outside the frame with the collars and set-screws $i'$, Fig. 2, which enable the operator to always set the gages square with the path of the covers. It will be observed that the rods $g'$ are bent or offset, so that by turning them axially in their sockets in the frame the height of the stops may be adjusted. As indicated in Fig. 9, the stops $f'$ are provided with the projecting guards $j'$, which reach over the edge of the cover when it is arrested by the stops and retain the cover in place by preventing any rebound by bending the front edge downward between the belts $b$, as indicated by the dotted line $B'$ in Fig. 9.

The upper belts $a$ are driven by the friction of the lower belts $b$. They may, however, if preferred, be driven positively. At their inner ends the belts $a$ run over a roller $l'$, supported on a shaft arranged to revolve in suitable brackets attached to the frame of the machine. These brackets are represented at $m'$, Figs. 1 and 2, and they are secured to the frame by set-screws, so that they may be adjusted up and down to vary the path of the belts $b$. It will be observed that the upper belts $a$ do not pass into the main frame of the machine, so that after the covers have passed beyond the upper belts they are advanced only by their friction against the lower belts $b$. At their left-hand ends the extensions J J' are connected together by the transverse tie-rod $k'$, which also serves to support the inner end of the feed-bank A.

The gum or glue is applied to the central line of the cover while passing between the feed-belts $a$ and $b$ by a cord or thread $n'$, Figs. 1 and 13, running over the pulleys $n''$ and $n'''$. The glue or adhesive material is contained in a tray or trough $p'$, from which it is conveyed to the cord $n'$ by the wheel $o'$. The tray $p'$ is mounted on the arm $r'$, carried by a rock-shaft $s'$, which receives vibrating motion from the cam $t'$ on the shaft $h$ through the arm $u'$. The motion of the arm $r'$ carries the roller $n''$ down, so as to bring the cord $n'$ in contact with the cover while passing underneath it. The movement of the roller $n'$ is indicated by the full and dotted lines in Fig. 1 of the accompanying drawings. At slow speeds the tray and roller will fall by their own weight; but at higher speeds it may be advisable to place a spring on the rock-shaft $s'$ or the arm $r'$. A convenient way of applying such a spring is indicated at $v'$, Fig. 2, which shows a coiled spring applied to the rock-shaft. The spring when used prevents any rebound in the arm $r'$ and its attachments. The tray is supported on the arm $r'$ by the rod $z'$, inserted in the arm and provided with a set-screw, so that the tray may be adjusted to its proper position. The arm $u'$ is bent so as to pass inside the extension of the frame J, as represented in Fig. 2. The roller $n''$ is supported on a suitable spindle in the forked end of the arm $r'$. The arm $r'$ is made adjustable lengthwise of the rock-shaft $s'$ by a feather and a set-screw. The roller $n'''$ is supported by the arms $w'$, attached to the tray $p'$. The shaft of the roller $n'''$ extends outward and carries a pulley which is driven from the roller $b'$ by a belt $x'$, Figs. 1 and 2. The wheel $o'$, which carries the adhesive material from the tray to the cord $n'$, is driven by the cord itself. The wheel $o'$ is provided with a scraper $y'$, which removes any excess of adhesive material from its sides. The cam $t'$ is made adjustable in its length, as indicated in Fig. 10, so as to enable the gluing mechanism to apply the adhesive material to covers of different sizes. It is preferred, also, that the streak of glue applied along the center lines of the covers should not extend quite up to the edges of the cover, but that an uncoated space of suitable length should be left at each end of the streak of glue, as thereby the surplus of glue, if any, is prevented from being squeezed out at the ends of the back of the pamphlet by the pressure applied by the clamps and the back-former. This result is accomplished for covers of different lengths by making the cam $t'$ variable in its length, so as to secure the requisite movement of the arm $r'$ and roller $n'$ in any given case. The cam $t'$ is provided with an adjustable segment $a''$, Fig. 10, secured to the main body of the cam by a bolt or screw, which permits it to be adjusted so as to vary the length of the active curved surface of the cam. By varying the angular position of the segment $a''$ relative to the cam $t'$ the period of time in which the roller $n''$ is permitted to come in contact with the cover is regulated. The lower end of the arm $u'$ is provided with a roller $b'$, which runs against the curved surface of the cam $t'$ and of the supplementary cam $a''$ when the latter is employed. While passing underneath the gumming-roller the covers are supported by the roller $i''''$, Figs. 1 and 2. This roller is mounted in suitable boxes on the extensions J J' in such position as to support the feed-belts immediately below the feed-roller. It is preferably made adjustable lengthwise on the machine, and it also may be adjusted up and down by inserting suitable packing between its journals and the frame. As indicated in Fig. 13, the roller $i''''$ is provided with a groove immediately under the gumming-wheel $n''$, so that as the covers pass between the gumming-wheel and the roller they are creased lengthwise on each side of the gumming-wheel and between its edges and the edges of the groove. The groove also permits any drip of adhesive material from the cord or wheel to pass downward into a suitable receptacle in case it becomes necessary at any time to stop the machine, and for this purpose also the roller $i''''$ may be placed slightly in advance of the gumming-roller, as indicated by the dotted lines in Fig. 2. In order to adapt the machine to the use of wide gumming-rollers and of two or more cords $n'$, as may be necessary when thick pamphlets are to be covered by the machine, I apply to the shaft of the roller $i''''$ the adjustable collars $z''$ $z'''$, which are provided with set-screws, so that they can be adjusted lengthwise of the shaft for the purpose mentioned.

The mechanism for feeding the pamphlets consists, essentially, of the reciprocating slide or sliding fingers $m$, Figs. 2 and 4, constituting what may be called a "gate," which sustains the pamphlet until at the proper time it is permitted to descend downward by the withdrawal of the gate, as indicated by the full and dotted lines in Fig. 4. The pamphlet then descends between the belts $e$ $e'$, running around the pulleys $f''$ $f'''$ on the shafts $d$ $d'$, by which the pamphlet is forced downward upon the glued cover B', which it carries down with it between the folding-rollers $c$ $c'$, by which the cover is folded on each side of the pamphlet. On emerging from between the folding-rollers $c$ $c'$ the covered pamphlet is guided by the chute D down into the clamps E E'. Either or both of the shafts $d$ $d'$, carrying the pulleys $f''$ $f'''$, may be supported in boxes adjustable on the frame-work of the machine; but in the accompanying drawings I have represented the shaft $d$ as revolving in stationary boxes, while the shaft $d'$ is mounted in the movable boxes $g''$, Fig. 4, which are forced inward by the springs $i''$, Fig. 2, on the rods $h''$. The rods $h''$ are provided with adjustable collars having set-screws $j''$, by which the tension of the springs is regulated. The outer ends of the rods are threaded and provided with the clamp-nuts $k''$ on the outside of the frame of the machine, by which the shaft $d'$ and its attachments may be adjusted bodily, so as to vary the width of the passage between the belts $e$ $e'$ to adapt the machine to different thicknesses of pamphlets. The belts $e$ $e'$ at their lower extremities run over the rollers $n$ $n''''$, Fig. 4. These rollers are supported at their ends by boxes carried by arms projecting downward from the boxes $g''$, as indicated by the dotted lines $l''$, Fig. 4. The shafts $d$ $d'$ are driven from a pulley $M''$, Fig. 3, on the shaft K by a belt or link-chain $N''$, running around suitable pulleys on the ends of the shaft and around an idler-pulley $N'''$.

The folding-rollers $c$ $c'$ are attached to the frame of the machine by any suitable devices which permit of their being adjusted both vertically and laterally. In Fig. 4 of the accompanying drawings the rollers are shown as supported by the standard T', attached to the frame-work of the machine, either on its inside or outside, by a bolt or screw passing through a slot, so that the rollers can be set in any desired position. The roller $c'$ is provided at its ends with journals which revolve in holes in the standard T'. The roller $c$ is supported by the adjustable arms V', which are carried by the rod U', passing through a boss on the standard T', which boss is provided with a set-screw bearing on the rod, so that the rollers $c$ $c'$ may be adjusted to any suitable position on the rod. The standard T' may be used to support the roller $c$, if preferred.

In order to provide for making the lower roll $n''''$ adjustable relatively to the upper roll $f'''$, I adopt the construction shown in Fig. 11, in which the box $g''$ is shown with a downwardly-projecting flange $l''$, in which is inserted a sliding stem $n'''''$, which carries at its outer end the journal at the extremity of the roller $n''''$ in a suitable box and is provided with a spring $o''$, located in the recess $m''$ in the flange and operating to constantly press the roller toward the pamphlet. The reduced end of the stem $n'''''$ projects beyond the flange and is provided with the jam-nuts $p''$, by which the position of the lower roller $n''$ relatively to the upper roller $f'''$ may be adjusted, and in case it is desired to fix the lower roller permanently relatively to the upper one this may be accomplished by inserting a set-screw in the flange $l''$, bearing on the stem $n'''''$.

As represented in the plan view, Fig. 2, the fingers $m$, which constitute the gate or detent by which the pamphlets are held on descending into the machine, except at the proper time, when a gummed cover is resting at B' on the belts $b$ ready to receive it, project between the pulleys $f''$ $f'''$, which carry the belts $e$ $e'$. The fingers are carried by a reciprocating plate S, Figs. 2 and 4, which receives a to-and-fro motion from a cam on the shaft $l$ through the lever T and the rod U, as is hereinafter described. The plate S is arranged to slide in suitable guides or ways V at each end, attached to the frame of the machine. The plate is provided with a central opening, through which the pamphlets are inserted back down, as represented at C in the accompanying drawings. A guide-board W is provided, against which the pamphlets are placed one after the other by the operative. The guide-board may be provided with suitable lateral gages for the pamphlets, as represented in Figs. 1, 2, and 4. The guide-board may also be made adjustable to adapt the machine to different thicknesses of pamphlets.

The clamps E E' are supported on the rods X X', which extend across the machine at right angles with the direction of the travel of the covers, and are secured in the side frames by collars and set-screws or other suitable devices. One of the clamps E is made to slide on the rods X X', while the other E' is fastened securely thereto. The mechanism for operating the movable clamp is represented in plan view, Fig. 5. It consists of a cam Y, Figs. 5 and 12, on the shaft $h$, which imparts a reciprocating motion to the rod Z, which operates the toggle-levers D' D'' D''' D''''. These levers are connected at their inner ends by suitable pivots to projecting lugs on the clamp E, while at their other ends they are pivoted to the bar F', supported by the threaded rod H'', passing through the side frame of the machine or the bar J'' secured thereto. Provision is made for adjusting the clamp E by shifting the bar F' by means of the nut I'' on the threaded rod H''. A rubber bumper G' is interposed between the bar F' and the support J'', so as to render the pressure produced on the pamphlet by the clamp E slightly yielding or elastic. A guide-rod K', Fig. 5, sliding through the support J'', is employed to steady the cross-bar F'. A spring L' is applied to one of the toggles for the purpose of securing the return movement of the toggles and the opening of the clamp. The movement of the clamp and of the toggles is represented by the full and dotted lines in Fig. 5. The clamp E is provided at either end with suitable ears bored to slide freely on the rods X X'. The cam Y, Figs. 5 and 12, on the shaft $h$ as it revolves comes in contact with the roller I''' on the rod Z and operates the toggle-levers, so as to cause the clamp E to slide on the rods X X' and compress the pamphlet between the clamps. The return movement of the clamp is secured by a suitable spring, such as L'. The outer end of the bar Z is slotted and slides on the shaft $h$. The double toggles D' D''' and D'' D'''' are connected together by a link L'', to which the bar Z is pivoted, so that the toggles are caused to move simultaneously and the clamp E is moved up squarely on the rods, and an even pressure on the pamphlets is thus secured, even if the pamphlet is not centrally located in the clamps.

The chute D is pivoted at O', Fig. 4, to the frame of the machine, and its lower end rests at O'' on the upper edge of the clamp E, so that the lower end of the chute partakes of the reciprocating motion of the clamp, as represented by the full and dotted lines in Fig. 4. In order, however, to provide for the positive disengagement of the covered pamphlet from the clamp E, in case they should manifest a tendency to adhere thereto, I provide the sides of the chute with the projecting ears P', Fig. 4, which extend over the stationary clamp E' and limit the return movement of the lower end of the chute, so that it does not travel back as far as the movable clamp E, but its lower end acts to detach the pamphlets from the movable clamp.

The stationary clamp E' is secured on the rods X X' by set-screws or other suitable devices. It is provided with the springs G, Figs. 4 and 5, which are strips of sheet metal extending upward from the clamp, and are bent over so that their lower ends project into the space between the two clamps. These springs operate as guides to direct the pamphlets between the clamps and also to prevent any rebound of the pamphlets after they have entered between the clamps and before they are compressed thereby. The springs G also act to detach the compressed pamphlets from the stationary clamp E'. The springs are preferably secured to the clamp by a clamp-bar S', which permits of their adjustment either laterally or vertically. The clamps E E' are provided at their lower edges with the pressure-bars R' R''.

The back-former F consists of a suitable flat plate or bar, against which the back of the pamphlet is arrested as it descends, and which then moves upward a short distance, after which the clamps are pressed against the pamphlet and the back-former is again forced upward, so as to square up the back of the pamphlet while compressed between the clamps. After the back has been squared by the back-former its pressure on the back of the pamphlet is released, and it is then shifted bodily out of the way, so that when the clamps discontinue the pressure on the pamphlet it may drop freely downward. The lateral movement of the back-former is indicated by the full and dotted lines in Fig. 4. These movements are imparted to the back-former by the cam Z' on the shaft $l$, which also operates the gate $m$ through the lever T and the rod U. This cam is represented on an enlarged scale in Fig. 14. The lever Q is pivoted on a shaft B'', which shaft is supported by the boxes C'' on the rods X X'. The vertical movements of the back-former are produced by a roller A'' on the outer end of the lever Q, which roller bears against the edge of the cam Z'. The first upward movement which the back-former receives is imparted to it by the inclined surface P'' of the cam Z', Fig. 3, while the next movement, which squares up the backs of the pamphlets, is imparted to it by the inclined surface P'''. The up-and-down movement of the lever Q is indicated by the full and dotted lines in Figs. 3 and 14. In order to provide for the lateral movement of the lever Q, which is necessary to move the back-former out of the way of the pamphlets descending through the clamps, I connect the levers Q and T below the cam Z' and operate them both from an additional cam E'', (represented in Fig. 14,) which is an elevation of the cam Z', taken from the side opposite to that shown in Fig. 3. At its lower end the lever T is provided with a slot C''', into which a pin F'' on the lever Q projects. The lever T is provided with a roller Y'', which bears against the cam E'', which is so located and shaped that as soon as the pressure of the back-former on the back of the pamphlets is released by the passage of the cam-surface P''' beyond the roller A'', the front surface of the cam E'' comes in contact with the roller Y'' and moves the lower end of the lever T outward, which carries with it the lever Q, the back-former F, and the boxes C'', which slide on the rod X X', as indicated by the full and dotted lines in Figs. 3 and 4.

The back-former is thus shifted laterally from below the clamps, so as to permit the free descent of the pamphlets. The return movement of the back-former and the two levers Q and T is secured by the two springs H″ H″ on the rods X X′, which springs bear against the frame at one end and against the sliding boxes C″ C″ at the other. The slot C‴ in the lower end of the lever T is provided with a spring G″, which holds up the outer end of the lever Q and keeps the roller A″ all the time in contact with the surface of the cam Z′. The pin F‴ enters a block arranged to slide in the slot C‴. The lever T is pivoted at J‴, Fig. 3, to a suitable bracket attached to the frame. At its upper end the lever T is pivoted to a block Z‴, arranged to slide on the rod U. A spring K‴ is interposed between the sliding block Z‴ and a collar M′ on the rod U. This spring K‴ relieves any danger of breakage in case a pamphlet should accidentally get caught in the gate.

The machine is provided with a feed-board Z‴ for the convenience of the operative who feeds the pamphlets into the machine.

Between the back-former F and the cross-bar at the inner end of the lever Q there is placed a rubber cushion or bumper A‴, Fig. 4. The back-former F is connected with the cross-bar by screws or bolts, which permit it to yield slightly, the rubber cushion being compressed by the pressure of the back-former on the back of the pamphlet. The roller A″ on the lever Q is provided with flanges which fit over the sides of the cam Z′ and serve as guides for the lever and back-former during their movements.

After the discharge of the covered pamphlets from the clamps they are received into the receptacle M‴, Fig. 3, the bottom of which is formed by the board or plate O‴ and the sides of which are formed by the vibrating packer Q‴, Figs. 3 and 15, and the movable plate R″, which slides along the board O‴ as the pamphlets accumulate in the receptacle. The packer vibrates, as indicated by the full and dotted lines in Fig. 3, on a rock-shaft T‴, operated at the proper time by an arm U‴, a suitable cam on the shaft h or the shaft l, and suitable connecting mechanism. The vibrating motion of the packer Q‴ is timed to take place immediately after a covered pamphlet is discharged from the clamps, so that the said pamphlet is moved toward the plate R″ and the packer returned, so as to have a space for the next pamphlet. As the pamphlets are delivered back down, in order to prevent the cover or leaves at their upper edges from opening, which would interfere with the delivery of the next pamphlet, I apply to the packer one or more springs V‴, Figs. 3 and 15, which prevent the cover or leaves of the last pamphlet discharged into the receptacle from interfering with the next pamphlet. The springs V‴ are conveniently formed of suitable spring-wire or metallic strips, and they are preferably attached to the upper end of the packer and inclined outward from its surface, as shown. The free ends of the spring or springs are recurved, so as not to injure the covers of the pamphlet.

The operation of my new pamphlet-covering machine will have been already understood from the preceding description.

As the covers are fed into the machine with their glued sides uppermost, they are at all times open to the inspection of the operative, and any derangement or accident is immediately detected, while the fact that the covers are glued on their upper sides enables me to feed the pamphlets down upon them in a direct and simple manner, thus greatly simplifying the arrangement and construction of the machine. Provision is also made for the adjustment of the different parts of the machine so as to adapt it to covering pamphlets of different relative lengths and widths and varying thicknesses.

The machine may be operated at any desired speed. For medium-sized pamphlets I prefer to run it at about forty pamphlets per minute.

In Fig. 14 the roller Y″ is represented as about to drop off the inclined surface E‴ of the cam E″, which movement permits the springs H″ to operate the gate m and to produce the return of the back-former underneath the clamps. This movement takes place gently as the roller runs down the cam E‴, so as to prevent any excessive jar or vibration in the machine.

The packer Q‴ may be perforated or provided with a series of holes which permit the air to enter freely between the packer and the pamphlet.

I claim—

1. The combination, with the slotted feed-bank A, of the reciprocating pushers o, arranged to project beyond the surface of the bank through the slots, substantially as described.

2. The combination, with the slotted feed-bank A, of the reciprocating pushers o, projecting through the slots in the bank, and the spring-fingers r, substantially as described.

3. The combination, with the slotted feed-bank A, of the reciprocating rod q, with transverse rods s, and the pushers o, arranged to project through the slots in the bank, substantially as described.

4. The combination, with the slotted feed-bank A, of the pushers o, the spring-fingers r, and the cover-carrying belts a b, substantially as described.

5. The combination, with the slotted feed-bank A, of the reciprocating rod q, transverse rods s and t, pushers o, and spring-fingers r, substantially as described.

6. The combination, with the slotted feed-bank A, of the reciprocating rod q, transverse rods s t, pushers o, spring-fingers r, and shaft u, substantially as described.

7. The combination, with suitable cover-carrying belts and a supporting-roller, of a vibrating gluing-roller $n''$, the gluing-cord $n'$, and means for supplying a suitable adhesive material thereto, substantially as described.

8. The combination, with suitable cover-conveying mechanism, of a vibrating device for applying adhesive material, arranged to apply the said material to the cover for a distance less than its width, substantially as described.

9. The combination, with suitable cover-conveying mechanism, of the vibrating glue-roll $n''$, cord or tape $n'$, carrying-roller $n'''$, and a wheel or roller $o'$, arranged with its upper surface in contact with the cord and its lower surface in a reservoir of a suitable adhesive material, substantially as described.

10. The combination, with suitable cover-conveying mechanism, of the vibrating glue-roller $n''$, and means for supplying adhesive material thereto, the cam $t'$, provided with adjustable segment $a''$, and suitable connecting mechanism, substantially as described.

11. The combination, with suitable cover-conveying mechanism, of the rock-shaft $s'$, arranged transversely to the path of the covers and carrying the glue-roller $n''$, and means for supplying adhesive material thereto on the arm $r'$, arranged to be adjusted lengthwise on the shaft, substantially as described.

12. The combination, with the cover-conveying belts $a$ $b$, of the slotted feed-bank A, reciprocating pushers $o$, spring-fingers $r$, and the stops $f'$, arranged to arrest the motion of the cover in the proper relation with the path of the pamphlets, substantially as described.

13. The combination, with the cover-conveying belts $b$, of the stop $f'$ and the projecting fingers $j'$, arranged to deflect the front edge of the cover between the belts, whereby any rebound of the cover is prevented, substantially as described.

14. The combination, with the cover-conveying belts $b$, of the adjustable stop $f'$, supported by the bent rod $g'$, so that the stop may be adjusted both laterally and vertically, substantially as described.

15. The combination, with the cover-conveying belt $b$, of the adjustable stops $f'$, carried on the bent rods $g'$, provided with the adjusting-collars $i'$, substantially as described.

16. The combination, with mechanism adapted to automatically feed pamphlet-covers one by one, of the lower cover-conveying belts $b$, and the upper belts $a$, of a length less than the lower belts, and suitable adjustable stops for arresting the motion of the covers while resting on the lower belts, substantially as described.

17. The combination, with mechanism adapted to automatically feed pamphlet-covers one by one, of the lower cover-conveying belts $b$, and the upper belts $a$, of a length less than the lower belts, and suitable adjustable stops for arresting the motion of the covers while resting on the lower belts, and suitable mechanism adapted to feed an uncovered pamphlet against the cover on the conveying-belt and to fold the cover about the pamphlet, substantially as described.

18. The combination, with the cover-conveying belts $a$ and $b$, of the vibrating glue-roller $n''$ and means for supplying a suitable adhesive material thereto, and the supporting-roller $i''''$, substantially as described.

19. The combination, with the cover-conveying belts $a$ and $b$, of the vibrating glue-roller $n''$ and means for supplying a suitable adhesive material thereto, and the supporting-roller $i''''$, provided with a circumferential groove opposite the glue-roller, substantially as described.

20. The combination, with the cover-conveying belts $a$ and $b$, of the vibrating glue-roller $n''$ and means for supplying a suitable adhesive material thereto, and the supporting-roller $i''''$, provided with adjustable collars $z''$ $z'''$, substantially as described.

21. The combination, with the pamphlet-feeding belts $e$ $e'$, of the reciprocating plate S, provided with the fingers $m$, substantially as described.

22. The combination, with the pamphlet-feeding belts $e$ $e'$, of a reciprocating plate S, cover-conveying belts $b$, and folding-rollers $c$ $c'$, substantially as described.

23. The combination, with the pamphlet-feeding belts $e$ $e'$, of the cover-conveying belts $b$, folding-rollers $c$ $c'$, and the clamps $e$ $e'$, substantially as described.

24. The combination, with the pamphlet-feeding belts $e$ $e'$, of the cover-conveying belts $b$, folding-rollers $c$ $c'$, clamps E E', and back-former F, substantially as described.

25. The combination, with the pamphlet-feeding belts $e$ $e'$, of the cover-conveying belts $b$, folding-rollers $c$ $c'$, clamps E E', and chute D, substantially as described.

26. The combination, with suitable cover-conveying belts and automatic mechanism adapted to feeding the covers one at a time and for applying a suitable adhesive material thereto, of suitable mechanism constructed and arranged to feed the pamphlet onto the glued covers and to fold the covers about the pamphlet, and suitable mechanism adapted to compress the pamphlet and to square its back, substantially as described.

27. The combination, with the pamphlet-feeding belts $e$, shaft $d$, and rollers $n$, arranged to revolve in stationary boxes, of the belts $e'$, shaft $d'$, and roller $n''''$, arranged to revolve in adjustable boxes, substantially as described.

28. The combination, with the pamphlet-feeding belts $e$, shaft $d$, and rollers $n$, arranged to revolve in stationary boxes, of the belts $e'$, shaft $d'$, roller $n''''$, arranged to revolve in adjustable boxes, rods $h''$, and springs $i''$, substantially as described.

29. The combination, with the pamphlet-feeding belts $e$, shaft $d$, and roller $n$, arranged to revolve in stationary boxes, of the belts $e'$, shaft $d'$, roller $n''''$, arranged to revolve in adjustable boxes, rods $h''$, springs $i''$, and adjusting-screws $k''$, substantially as described.

30. The combination, in a pamphlet-covering machine, with a stationary clamp $E'$, provided with the adjustable spring-fingers G, of the movable clamp E, substantially as described.

31. The combination, in a pamphlet-covering machine, with a stationary clamp $E'$, provided with the adjustable spring-fingers G, of the movable clamp E and pivoted chute D, substantially as described.

32. The combination, with the pamphlet-feeding belts $e\ e'$, of the cover-conveying belts $b$ and the adjustable folding-rollers $c\ c'$, substantially as described.

33. The combination, with the clamps E E′, of the back-former F, lever Q, and cam Z′, provided with cam-surfaces P″ P‴, substantially as described.

34. The combination, with the clamps E E′, of the back-former F, lever Q, and cam Z′, provided with cam-surfaces P″ P‴, and suitable cam mechamism adapted to withdraw the back-former from the clamps, so as to permit the discharge of the covered pamphlet, substantially as described.

35. The combination, with the cover-conveying belts of a pamphlet-covering machine, of suitable automatic cover-feeding mechanism, suitable cover-gluing apparatus arranged to apply a suitable adhesive material to the upper surfaces of the covers, suitable automatic pamphlet-feeding mechanism located above the path of the cover, and suitable cover-folding devices and pamphlet compressing and shaping mechanism located below the path of the covers, substantially as described.

HENRY R. CORKHILL, SR.

Witnesses:
GEO. B. SELDEN,
C. G. CRANNELL.